United States Patent [19]

Callahan, Jr. et al.

[11] Patent Number: 5,639,585

[45] Date of Patent: Jun. 17, 1997

[54] SYSTEM FOR PHOTOGRAPHICALLY RECORDING DIGITAL DATA AND ANALOG SOUNDTRACK, AND MEDIUM HAVING DIGITAL DATA AND ANALOG SOUNDTRACK RECORDED THEREON

[75] Inventors: Raymond E. Callahan, Jr., Torrance; Howard J. Flemming, Valencia; LeRoy H. Reese, Burbank; Shawn F. Jones; Dana B. Wood, both of Los Angeles, all of Calif.

[73] Assignees: Sony Corporation, Japan; Sony Cinema Products Corporation, Culver City, Calif.

[21] Appl. No.: 522,428

[22] Filed: Aug. 31, 1995

[51] Int. Cl.$^6$ .............................. G03C 5/14; C03B 31/02
[52] U.S. Cl. .............................. 430/140; 352/27; 352/11; 352/37
[58] Field of Search .............................. 430/140; 352/27, 352/11, 37

[56] References Cited

U.S. PATENT DOCUMENTS

| | | | |
|---|---|---|---|
| 3,502,398 | 3/1970 | Michelson | 352/37 |
| 3,932,032 | 1/1976 | Weinstein | 352/11 |
| 4,074,085 | 2/1978 | Russell | 179/100.3 |

(List continued on next page.)

FOREIGN PATENT DOCUMENTS

| | | | |
|---|---|---|---|
| 0 040 188 | 11/1981 | European Pat. Off. | G03B 31/02 |
| 0 188 627 A1 | 7/1986 | European Pat. Off. | G11B 20/18 |
| 0 191 410 A2 | 8/1986 | European Pat. Off. | G11B 20/18 |
| 0 349 325 A2 | 3/1990 | European Pat. Off. | G11B 20/10 |
| 0 544 090 A1 | 6/1993 | European Pat. Off. | H04N 5/91 |
| WO91/05335 | 4/1991 | WIPO | G11B 7/00 |
| WO91/16709 | 10/1991 | WIPO | G11B 20/12 |
| WP 92/06409 | 4/1992 | WIPO | G03B 31/00 |
| WO92/14239 | 8/1992 | WIPO | G11B 7/00 |

OTHER PUBLICATIONS

"Cinema Digital Sound," *Image Technology* (Journal of the BKSTS), Jul. 1990, vol. 72, No. 7, London, Great Britain, pp. 69–70.

"Digital–Optical Data Makes Movies Sound Better," *Machine Design*, Feb. 21, 1991, vol. 63, No. 4, Cleveland, Ohio, US, pp. 30–31.

(List continued on next page.)

*Primary Examiner*—Mark F. Huff
*Attorney, Agent, or Firm*—Limbach & Limbach LLP

[57] ABSTRACT

A photosensitive medium, such as motion picture film, having digital data in multiple formats and analog audio signals photographically recorded thereon, and a system for photographically recording digital data (preferably including digital audio bits) in multiple formats and optionally also analog audio signals on a medium. Preferably, two digital soundtracks are recorded on the film, each in an array of bit areas arranged in row and column order, with the bit areas of one soundtrack between consecutive pairs of sprocket holes along one edge of the film, and the bit areas of the other soundtrack along the film edges outside the sprocket holes. Preferred embodiments of the invention include a camera assembly through which a motion picture film translates in real time. The camera assembly includes a first assembly for photographically recording digital data on the film in a first format by exposing the film to light of a first wavelength, a second assembly for photographically recording additional digital data on the film (in at least one different format than does the first assembly) by exposing the film to light of a second wavelength, and optionally also a third assembly for photographically recording analog audio signals on the film. Alternative embodiments include a first camera assembly for recording digital data on the film in a first format by exposing the film to light of a first wavelength as the film translates at a real time rate, and a second camera assembly for recording additional digital data on the film (in at least one different format than does the first assembly) by exposing the film to light of a second wavelength as the film translates at a less than real time rate.

22 Claims, 8 Drawing Sheets

U.S. PATENT DOCUMENTS

| | | | |
|---|---|---|---|
| 4,202,018 | 5/1980 | Stockham, Jr. | 371/10.1 |
| 4,256,389 | 3/1981 | Engebretson | 352/11 |
| 4,306,781 | 12/1981 | Mosely | 352/37 |
| 4,461,552 | 7/1984 | Levine | 352/27 |
| 4,491,399 | 1/1985 | Bell | 352/92 |
| 4,553,833 | 11/1985 | Kanaoka et al. | 355/40 |
| 4,600,280 | 7/1986 | Clark | 352/37 |
| 4,622,598 | 11/1986 | Doi et al. | 360/22 |
| 4,659,198 | 4/1987 | Beauviala et al. | 352/92 |
| 4,697,212 | 9/1987 | Osawa et al. | 360/48 |
| 4,870,633 | 9/1989 | Matsushita et al. | 369/47 |
| 4,893,921 | 1/1990 | Beauviala | 352/92 |
| 5,113,293 | 5/1992 | Endo et al. | 360/32 |
| 5,155,510 | 10/1992 | Beard | 352/27 |
| 5,194,996 | 3/1993 | Shores | 360/48 |
| 5,271,021 | 12/1993 | Berlekamp et al. | 371/37.1 |
| 5,271,022 | 12/1993 | Berlekamp et al. | 371/37.1 |
| 5,327,182 | 7/1994 | Kohut et al. | 352/27 |
| 5,347,509 | 9/1994 | Goldberg et al. | 369/275.3 |
| 5,453,802 | 9/1995 | Kohut et al. | 352/27 |
| 5,485,232 | 1/1996 | Saito et al. | 352/37 |

OTHER PUBLICATIONS

Dr. Ing. Klaus–Peter Anders, "DOSCAR—A Digital Optical Sound Technique," *Image Technology* (Journal of the BKSTS), Jun. 1991, vol. 73, No. 6, London, Great Britain, pp. 208–213.

Enz, "Cinema Digital Sound—Premiere eines neuen Lichttonverfahrens in Brussel," *Fernseh–Und Kino–Technik*, 1991, vol. 45, No. 1, Heidelberg, Germany, pp. 30–33, 36 and 37 (English translation included).

Syd Wiles, et al., "Digital Optical Sound on 35mm Motion–Picture Film", S.M.P.T.E. Journal, vol. 99, No. 11, pp. 899–908 (Nov. 1990).

Eastman Kodak Company, "2374 EASTMAN Digital Sound Recording Film" Data Sheet, three pages (1990).

Eastman Kodak Company, "53 733 EASTMAN Sound Recording II Film", Data Sheet, three pages (1981).

SYSTEM FOR PHOTOGRAPHICALLY RECORDING DIGITAL DATA AND ANALOG SOUNDTRACK, AND MEDIUM HAVING DIGITAL DATA AND ANALOG SOUNDTRACK RECORDED THEREON

FIELD OF THE INVENTION

The invention relates to a medium (such as motion picture film) having an analog audio soundtrack and digital data (e.g., a digital audio soundtrack) photographically recorded thereon, and to apparatus for photographically recording both analog audio signals and digital data on a medium such as motion picture film.

BACKGROUND OF THE INVENTION

Various formats for photographic recording of digital soundtracks on motion picture film have been proposed. For example, U.S. Pat. No. 4,600,280, issued Jul. 15, 1986, describes a technique for recording a digital soundtrack on a film strip by exposing the film to modulated light from a light source. In one method disclosed in U.S. Pat. No. 4,600,280, an intermittent light beam (encoded with digital audio information) is scanned horizontally across the film, and the film is then advanced vertically and the scanning process repeated. U.S. Pat. No. 4,600,280 suggests alternatively that the light can be projected on the film through a linear array of solid state shutters or Bragg cell modulators.

U.S. Pat. No. 4,461,552, issued Jul. 24, 1984, also discloses a method in which digital audio is photographically recorded on motion picture film.

U.S. Pat. No. 5,453,802, issued Sep. 26, 1995, entitled "Method and Apparatus for Photographically Recording Digital Audio and a Medium having Photographically Recorded Digital Soundtracks" and assigned to Sony Electronics Inc., discloses a method and apparatus for photographically recording digital audio signals, and a medium having digital audio signals photographically recorded thereon. The text of U.S. application Ser. No. 07/896,412 issued as U.S. Pat. No. 5,453,802, is hereby incorporated into the present disclosure by reference.

U.S. Pat. No. 5,471,263, issued Nov. 28, 1995, entitled "Method for Recording a Digital Audio Signal on a Motion Picture Film" and assigned to Sony Corporation, also discloses a method for photographically recording digital audio signals on motion picture film, and a film having digital audio signals photographically recorded thereon.

Several formats for photographically recording digital data on film (in addition to an analog soundtrack) have been proposed.

For example, U.S. Pat. No. 5,327,182, issued Jul. 5, 1994 and assigned to Sony Electronics Inc., discloses motion picture film having analog audio signals photographically recorded in the area between the sprocket holes on one side (the "right" side) of the film and the film's picture area. Digital audio signals are also photographically recorded on the film in two areas: between the sprocket holes on the right side of the film and the analog audio signals; and between the sprocket holes on the left side of the film and the film's picture area.

For another example, PCT International Application WO 92/14239, by Dolby Laboratories Licensing Corporation, published Aug. 20, 1992 discloses motion picture film having digital audio signals photographically recorded in areas between the sprocket holes along one side (the "right" side) of the film, and analog audio signals photographically recorded in the area between the sprocket holes on the right side of the film and the film's picture area.

Typically, a soundtrack (digital or analog) is recorded on a "negative" film, and a theater-ready ("positive") print of color motion picture film is produced using this negative film and another negative film. The former negative film is produced by exposing film stock (typically "black and white" film stock) to optical signals (which represent digital or analog audio information). The latter negative film is color negative film which has negatives of the motion picture images recorded thereon. Both negative films are translated through a printer to photographically produce the theater-ready print (which has both positive images and audio information recorded thereon).

It would be desirable to use recording equipment of conventional optical design to photographically record digital data in multiple formats (as well as an analog soundtrack) in real time (e.g., at the conventional "real time" rate of 24 frames per second) on a "negative" motion picture film (for use in generating a positive print). However, the various available systems for photographically recording digital data on film in a single format are typically incompatible, in the sense that they employ light in different wavelength ranges to image the digital data on film.

For example, one digital soundtrack recording camera in commercial use (the Sony Model DFR-C2000A camera; available from Sony Corporation) employs red light from LEDs to record a digital soundtrack (in the "Sony SDDS" format to be discussed below) on conventional 35 mm "black and white" film stock which is very sensitive to red light but much less sensitive to green light (such as Eastman 2374 Single Layer Ortho-Chromatic Sound Negative Stock Film available from Eastman Kodak) to produce a sound negative film for use in producing a positive motion picture print. However, another one digital soundtrack recording camera in commercial use employs green light to record a digital soundtrack (in the Dolby "SR-D" format to be discussed below) on conventional 35 mm "black and white" film stock which is sensitive to green light but much less sensitive to red light (such as Eastman SO-213 Single Layer Ortho-Chromatic Sound Negative Stock Film available from Eastman Kodak).

Until the present invention, digital data (in multiple formats) had not both been recorded photographically on a single "black and white" motion picture film by sequentially illuminating the film with light of different wavelengths (two different wavelengths for two different formats). Nor had it been known how to photographically record digital data (such as soundtrack data) in each of two or more different formats, and also an analog soundtrack, in real time on a single motion picture film (or other photosensitive medium).

SUMMARY OF THE INVENTION

In one aspect, the invention is a medium having digital signals photographically recorded thereon in multiple formats, and also having an analog audio soundtrack photographically recorded thereon. In preferred embodiments, the medium is a motion picture film. Another aspect of the invention is a system for photographically recording digital data (preferably including digital audio data) in multiple formats, and optionally also analog audio signals, on a single medium (such as motion picture film). In preferred embodiments, the recording is done in real time.

In a class of preferred embodiments, motion picture film recorded in accordance with the invention has multiple digital audio soundtracks (recorded in at least two different formats), and an analog audio soundtrack, photographically recorded thereon. Alternatively, a motion picture film recorded in accordance with the invention has digital data photographically recorded thereon in at least two different formats. The digital data can consist of audio soundtrack data, or time code data (or other non-soundtrack data), or both.

In preferred embodiments, two digital soundtracks are recorded on a film (with an analog soundtrack), each digital soundtrack in an array of bit areas arranged in row and column order, with one digital audio bit recorded in each bit area. Each column is oriented substantially parallel to the longitudinal axis (and travel direction) of the film, and each row is oriented substantially perpendicular to the longitudinal axis. The bit areas of one soundtrack are recorded in a column area ("sprocket column area") containing the sprocket holes along one edge of the film (the bit areas of this soundtrack are between consecutive pairs of longitudinally separated sprocket holes). The bit areas of the other soundtrack are recorded in strips along the edges of the film (with all the sprocket holes located between these strips).

Preferred embodiments of the inventive system for photographically recording digital data and analog audio signals on a motion picture film include a camera assembly through which the film translates in real time. The camera assembly includes first means for photographically recording digital data in a first format on film by exposing the film to light of a first wavelength, second means for photographically recording additional digital data in another format on the film by exposing the film to light of a second wavelength, and control and timing means for controlling operation of the film transport means, the first data recording means, and the second data recording means. The camera assembly optionally also includes means for photographically recording analog audio signals on the film by exposing the film to light including one or both of the first wavelength and the second wavelength.

In alternative embodiments, the inventive system includes means for implementing a two pass method, including the steps of: recording digital data in one format (and optionally also an analog soundtrack) on film in real time using a first camera assembly; and then translating the film through a second camera assembly at a specially chosen slow rate (i.e., a rate slower than the real time rate, such as 12 frames per second where the real time rate is 24 frames per second) to record additional digital data in at least one other format (and optionally also an analog soundtrack) on the film. A slow rate in the second camera assembly is necessary where the film used has low sensitivity to the wavelength (or wavelengths) of illuminating radiation employed in the second camera assembly, although it has high sensitivity to the wavelength (or wavelengths) of illuminating radiation employed in the first camera assembly.

The invention enables motion picture film companies to record multiple audio formats (digital and optionally also analog) onto the same 35 mm negative film. Thus, the soundtrack for a given film can be released in multiple formats on the same print. Therefore, no matter what projection and soundtrack playback hardware each theater uses, the print will be compatible with the theater's hardware.

DETAILED DESCRIPTION OF THE PREFERRED EMBODIMENTS

One preferred format for recording digital data (including digital soundtrack data) on motion picture film (on which an analog soundtrack is also recorded) will first be described with reference to FIGS. 1–4. Then, motion picture film having digital data recorded thereon in three different formats (in addition to an analog soundtrack) in accordance with the invention will be described with reference to FIG. 5.

Figure 1:
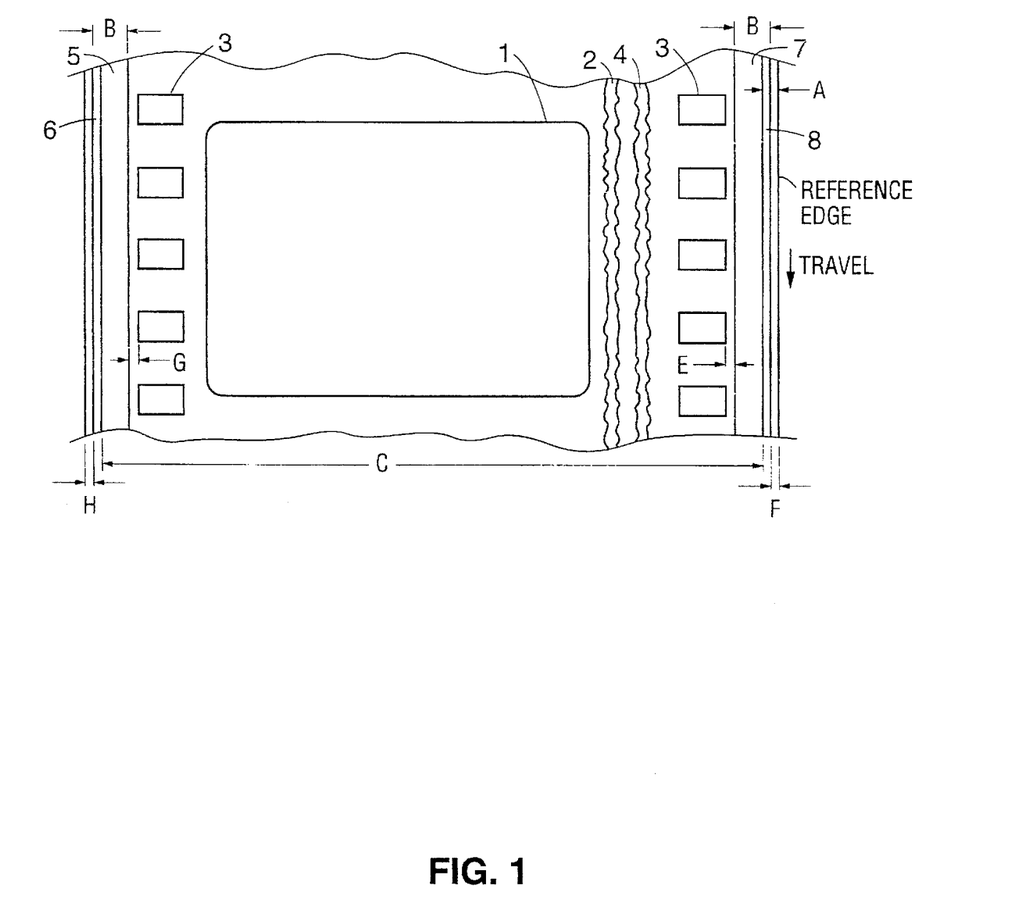
FIG. 1 is an elevational view of a section of motion picture film on which a digital soundtrack (having two data areas, one along each edge of the film) and one stereo analog soundtrack have been recorded.

FIG. 1 is an elevational view of a section of motion picture film on which a digital soundtrack consisting of digital data recorded in data areas 5 and 7 along the edges of the film, and a stereo analog soundtrack (comprising left channel 2 and right channel 4) have been photographically recorded. FIG. 1 shows the motion picture film as viewed from the photographic emulsion side. The film has two columns of sprocket holes 3 for engagement by a film transport means to translate the film in the travel direction (indicated by an arrow labeled "Travel") parallel to the film's longitudinal axis, and has picture areas 1 between the two columns of sprocket holes 3. The right edge of the film is labeled the "reference edge" in FIG. 1. The term "column area" will be used to denote a region extending longitudinally along the film, parallel to the travel direction.

The analog audio soundtrack comprising left channel 2 and right channel 4 is recorded in the column area between picture areas 1 and the column of sprocket holes 3 nearest the reference edge.

The motion picture film of FIG. 1 can be either be a "positive" print (for projection in a theater) or a "negative" film (which is used to photographically produce a positive print).

The format of the digital soundtrack of FIG. 1 is determined (in part) by the following specifications: digital audio data (and associated data such as tracking, clocking, and error correction bits) is recorded in rectangular bit areas within data column area 7 near the film's reference edge and data column area 5 along the film's other edge (the left edge in FIG. 1). Data area 5 includes tracking bits (determining a tracking edge) in column area 6, and data area 7 includes tracking bits (determining a tracking edge) in column area 8.

Each of data areas 5 and 7 was width B in the direction perpendicular to the reference edge (i.e., in the direction perpendicular to the film travel direction). The tracking edge in column area 8 is distance A from the reference edge (the right edge in FIG. 1). The tracking edge in column area 6 is distance C from the reference edge (the right edge in FIG. 1). The left edge of data area 7 is distance E from the right edge of each sprocket hole 3 in the column of sprocket holes nearest to the reference edge. The right edge of data area 5 is distance G from the left edge of each sprocket hole 3 in the sprocket hole column farthest from the reference edge. The outer (right) edge of data area 7 is distance F from the reference edge of the film. The outer (left) edge of data area 5 is distance H from the opposite (left) edge of the film.

In the case that the motion picture film of FIG. 1 is a conventional 35 millimeter positive print (for projection in a theater), the format of the digital soundtrack is determined (in part) by the following dimensions (all given in millimeters):

A=0.295+/−0.05;
B=1.536+/−0.02;
C=34.681+/−0.07;
E=0.175+/−0.05;
F=0.120+0.1 (−0);
G=0.175+/−0.05; and
H=0.120+0.1 (−0).

In the case that the motion picture film of FIG. 1 is a conventional 35 millimeter negative print (for use in producing a positive print), the format of the digital soundtrack is determined (in part) by the following dimensions (all given in millimeters):

A=0.295+/−0.02;
B=1.536+/−0.02;
C=34.681+/−0.04;
E=0.175+/−0.02;
F=0.120+0.1 (−0);
G=0.175+/−0.02; and
H=0.120+0.1 (−0).

Preferably, the digital soundtrack recorded in areas 5 and 7 comprises twelve audio "channels," as well as additional digital bits for clocking, tracking, error detection and correction, and optionally other functions. The twelve audio channels are: a left channel (sometimes referred to as "L"), a center channel ("C"), a backup center channel, a right channel ("R"), a left center channel ("LC"), a right center channel ("RC"), a subwoofer channel ("SW"), a backup subwoofer channel, a surround left channel ("SL"), a surround right channel) ("SR"), a right mixed channel (a mixture of channels R, RC, and SR, sometimes referred to as "RM"), and a left mixed channel (a mixture of channels L, LC, and SL, sometimes referred to as "LM"). The twelve digital soundtrack channels are scrambled and then interleaved, and then recorded as a sequence of blocks along areas 5 and 7.

In preferred implementations of the digital soundtrack of FIG. 1, each bit of digital data is photographically recorded in a rectangular bit area on the film. The bit areas are arranged in row and column order, with each column oriented parallel to the longitudinal axis of the film, and each row oriented perpendicular to the longitudinal axis.

To record the bits on a "negative" film (for use in preparing a positive print), the film is translated continuously while digital bits are recorded in the bit areas. Many bits are recorded simultaneously in each row of bit areas, if the bit areas in the row simultaneously receive light from an LED array (but they could alternatively be recorded using coherent radiation that has been modulated by a linear shutter array). In the latter alternative embodiment, one or more laser beams would be encoded with the digital data for each row by passing through the linear shutter array, and the encoded radiation would then be projected on one row of the digital soundtrack. For recording bits of the digital soundtrack of FIG. 1 on typical motion picture film, radiation in the red visible range (from an LED array) is typically used. However, to record digital soundtracks having other conventional formats (to be described below) or analog soundtracks on film, radiation in another wavelength range (e.g., the green visible range) is conventionally used.

Figure 3:
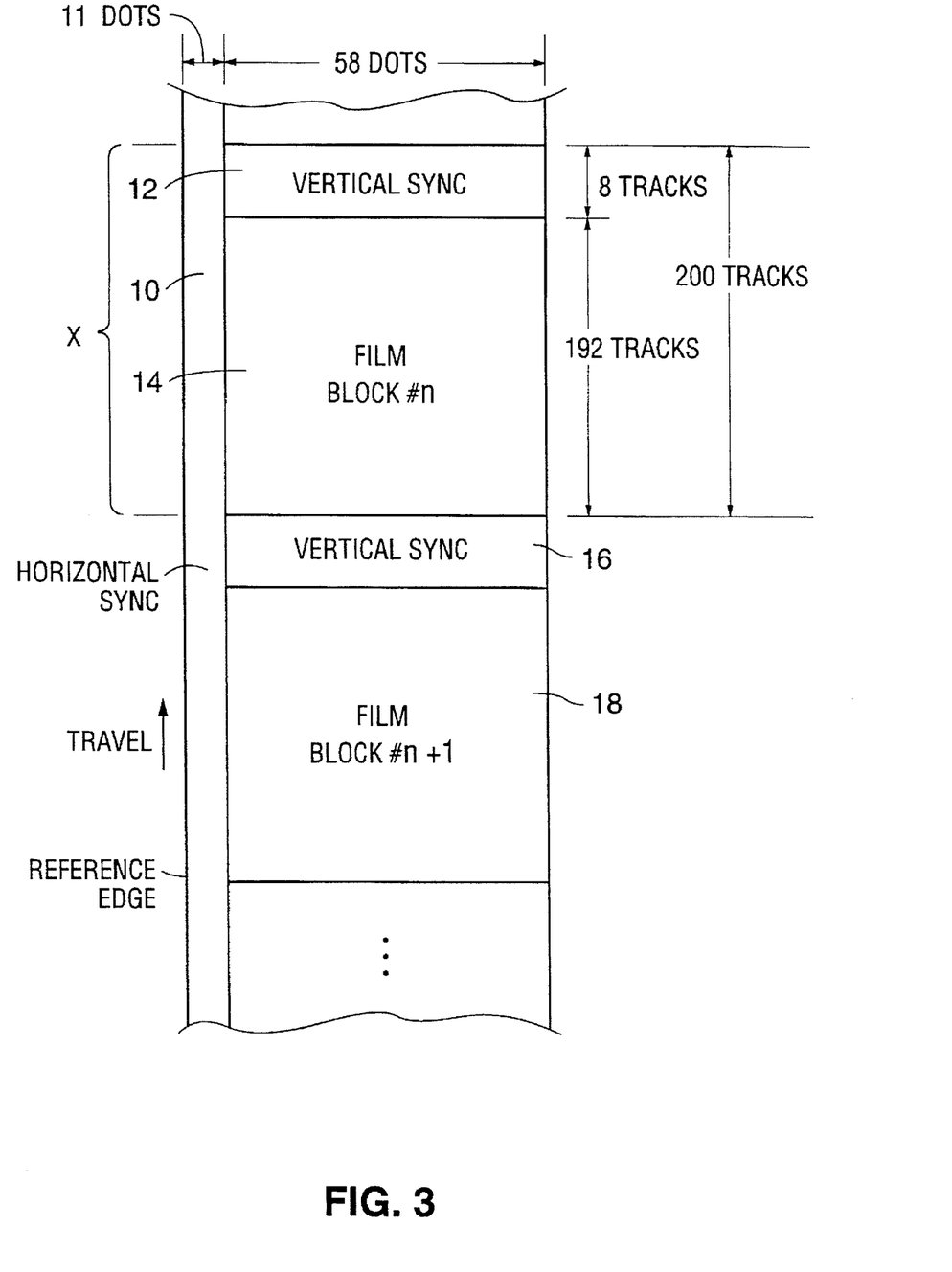
FIG. 3 is a diagram representing a portion of area 7 of the digital soundtrack of FIG. 1 and the adjacent edge portion of the film (rotated by 180 degrees in the sense that the direction of film travel in FIG. 3 is "up" whereas it is "down" in FIG. 1).

Each block of data in the digital soundtrack of FIG. 1 includes vertical sync bits and horizontal sync bits, as well as audio data bits. With reference to FIG. 3 (which represents a portion of area 7 of FIG. 1 and the adjacent edge portion of the film), one implementation of the FIG. 1 digital soundtrack consists of data block, with each block consisting of 200 rows of bits (200 rows of bit areas) of which the first eight rows include vertical sync bits and the following 192 rows include audio bits. In this implementation, horizontal sync bits (typically comprising tracking bits defining a tracking edge, and clocking bits) are recorded in the first few columns of each row. As shown in FIG. 3, horizontal sync bits are recorded in column area 10 (whose width is eleven bit areas, and whose length spans the length of the data area recorded on the film), the vertical sync bits of one block (block "n") are recorded in area 12, the audio bits of block "n" are recorded in area 14, the vertical sync bits of the next block (block "n+1") are recorded in area 16, and the audio bits of block "n+1" are recorded in area 18.

Figure 4:
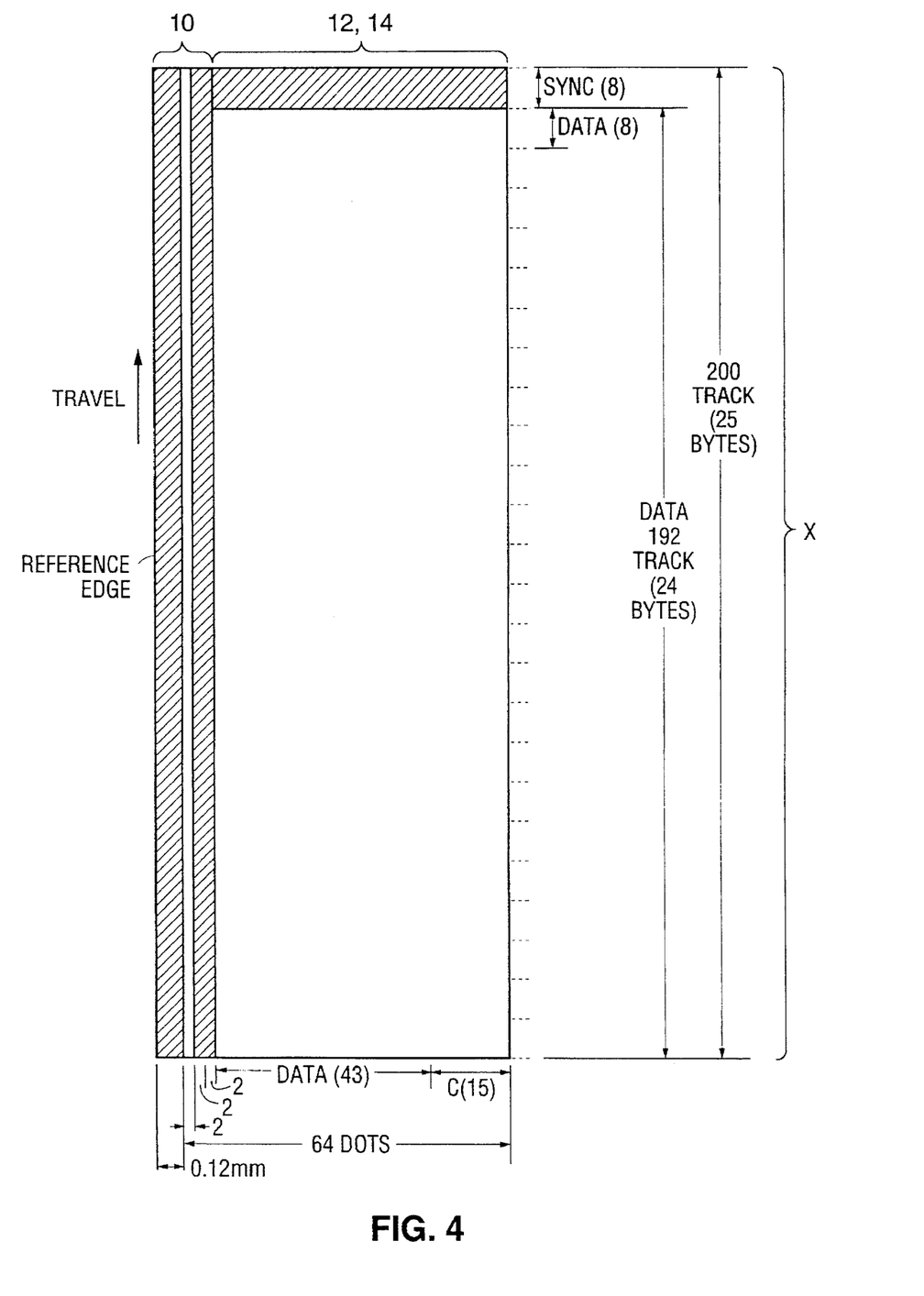
FIG. 4 is a diagram representing a portion of FIG. 3 (comprising one block of bit areas of FIG. 3).

FIG. 4 represents a portion of FIG. 3 (one film block), comprising the 200 rows of bit areas identified as row area X in both FIGS. 3 and 4. Some of these bit areas are in area 10 (which is eleven bit areas wide) and the rest are in areas 12 and 14. No data is recorded in the portion of area 10 (whose width is 0.12 mm, which represents the width of five bit areas) nearest the reference edge of the film (the left edge in FIG. 4), and tracking and clocking bits are recorded in the remaining portion of area 10 (which is six bit areas in width). Audio data is recorded in the forty-three columns of area 14 nearest to area 10, and other digital data is recorded in the remaining fifteen columns of area 14. Vertical sync data is recorded in area 12 (which is fifty-eight columns wide and 8 rows long).

The digital data format of FIGS. 1–4 is known in the industry as the "SDDS" format or the "Sony SDDS" format (Sony and SDDS are registered trademarks of Sony Corporation).

Figure 5:
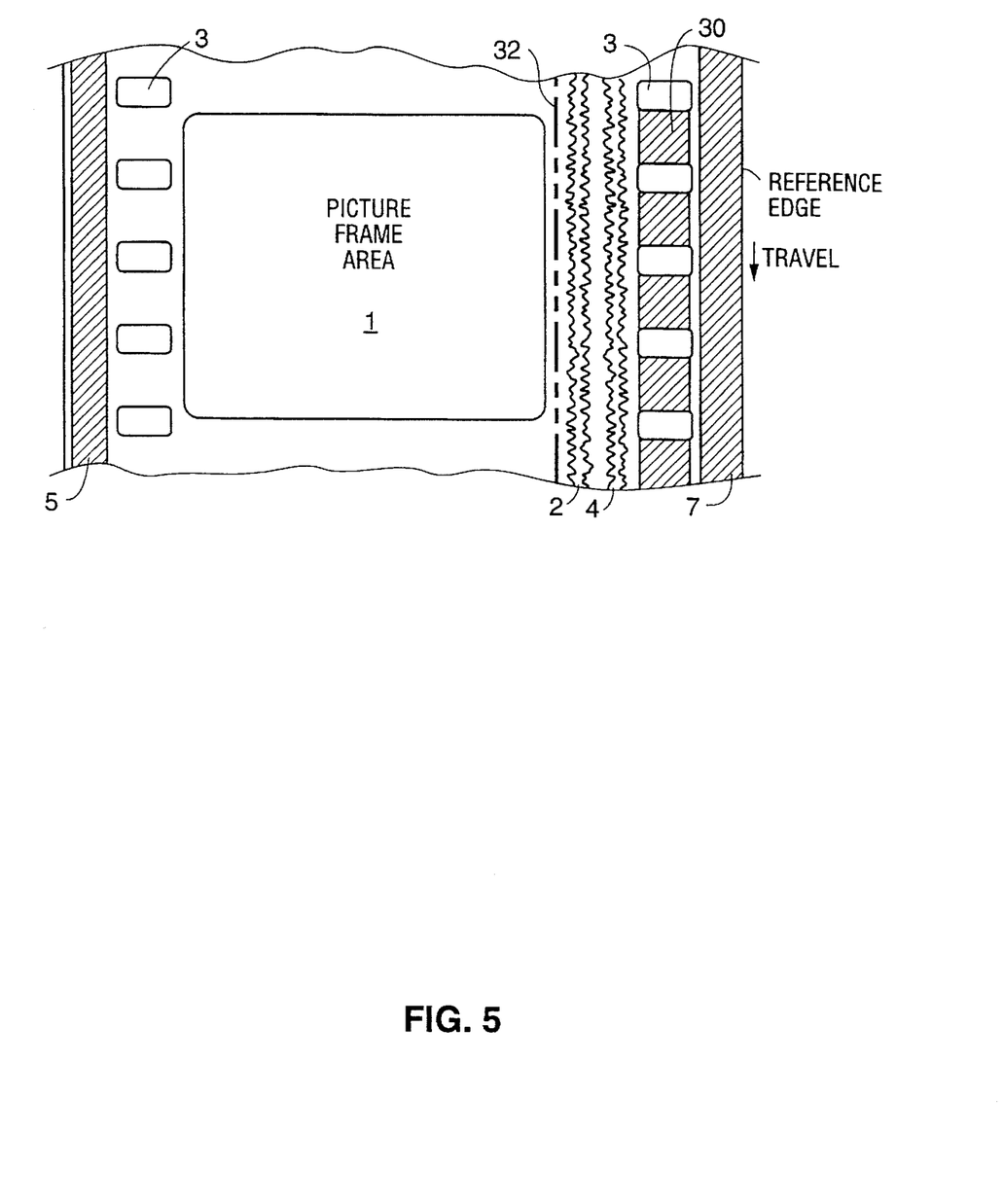
FIG. 5 is an elevational view of a section of motion picture film on which digital data in three different formats (including a digital soundtrack of the type shown in FIG. 1, and a second digital soundtrack in a different format), as well as one stereo analog soundtrack, have been recorded.

In accordance with the invention, digital data is photographically recorded on motion picture film (or another medium) in two or more different formats (in addition to an analog soundtrack). FIG. 5 shows a motion picture film having digital data photographically recorded thereon in three different formats, and an analog soundtrack also photographically recorded thereon. Some of the data is recorded in column areas 5 and 7 in the abovedescribed SDDS format.

The data in areas 5 and 7 includes audio data and determines a first digital soundtrack.

Still with reference to FIG. 5, another subset of the digital data is recorded in column area 30 (a "sprocket column area") containing the column of sprocket holes 3 nearest the film's reference edge. The bit areas of sprocket column area 30 are between consecutive pairs of longitudinally separated sprocket holes 3. The data in area 30 includes audio data and determines a second digital soundtrack. This second digital soundtrack can be in the conventional format known as the Dolby "SR-D" format (Dolby and SR-D are registered trademarks of Dolby Laboratories Licensing Corporation).

Still with reference to FIG. 5, a third subset of the digital data is recorded in column area 32, between the analog stereo soundtrack (comprising left and right analog audio channels 2 and 4) and the picture column area comprising picture areas 1. The data in area 32 can include audio data and determine a third digital soundtrack. However, in preferred embodiments, it is contemplated that the data in area 32 does not determine an audio soundtrack and instead consists of time code data in the conventional format known as the "DTS" format (DTS is a registered trademark of Matsushita Corporation).

A preferred embodiment of the inventive system for photographically recording digital and analog audio signals on motion picture film (in the format of FIG. 1) will next be described with reference to FIGS. 6 and 8.

Figure 6:
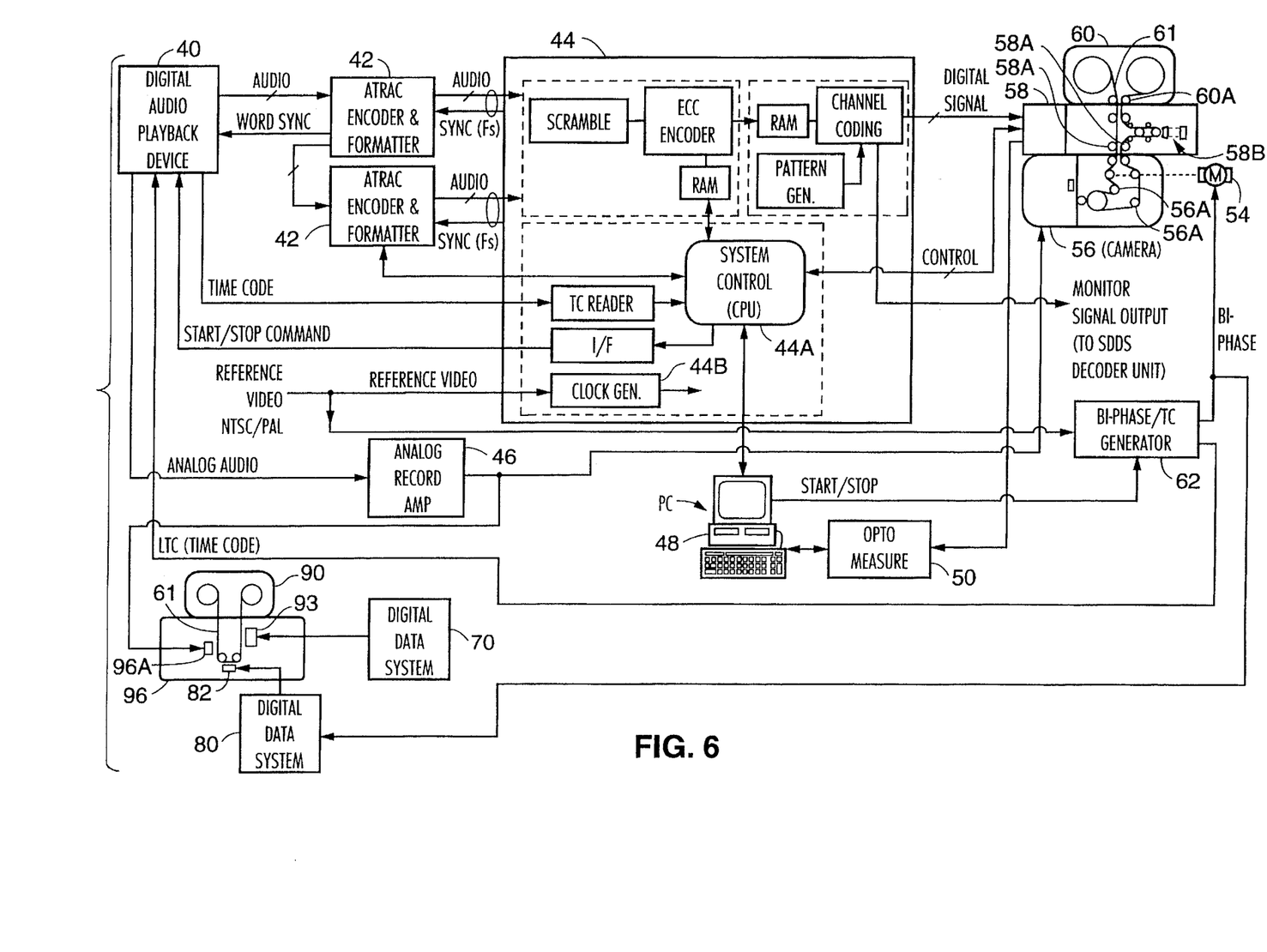
FIG. 6 is a block diagram of an embodiment of the inventive system which includes a first camera assembly for photographically recording both digital and analog audio signals on a single motion picture film in real time (to produce film having the format shown in FIG. 1), and also includes a second camera assembly for recording additional data on the film (in a different format) on the same film at a rate slower than a real time rate.

In FIG. 6, audio playback device 40 outputs a stream of parallel bits of digital audio data to one of two identical audio data compression units 42. Units 42 cooperate to process the audio data in parallel (including by compressing the data, preferably in accordance with the well known ATRAC data compression method). Each unit 42 outputs a stream of parallel bits of compressed digital audio data to processor 44. A Sony Model DFR-E2000 encoder unit (available from Sony Corporation) is suitable for use as each unit 42 in preferred embodiments of the FIG. 6 system.

Audio playback device 40 also outputs a stereo analog audio signal to analog audio signal amplifier 46. Typically, the analog signal provided to amplifier 46 contains the same audio information (or a subset thereof) as does the digital audio data provided to units 42. Device 40 also outputs time code data to a time coder reader within processor 44. Device 40 operates (in a manner to be described below) in response to word sync signals received from units 42 and time code signals from device 62. Device 40 is initially in a standby Chase Synchronization mode. Its actual start cue is initiated when time code input from device 62 is sensed by device 40. A start/stop command supplied from processor 44 to control device 40 is normally not used (but could be used in a variation on the FIG. 6 system which omitted device 62).

Processor 44 processes the compressed audio data from units 42, including by placing the data in SDDS format, and providing the SDDS formatted data to digital camera 58, so that camera 58 can record the SDDS formatted data in SDDS format on motion picture film 61 provided to camera 58 from analog camera 56. Film magazine 60 (which preferably has 2000 foot capacity) is mounted to camera 58 to provide the film through camera 58 to analog camera 56, and to take up the recorded film from camera 58. CPU 44A of processor 44 supplies control signals to camera 58 (to control the operation of camera 58) and receives and responds to control signals from a processor within camera 58 during operation of camera 58. Processor 44 introduces the appropriate delay (e.g., relative to the analog audio output from amplifier 46) into the digital data stream to be recorded on film in camera 58.

The digital data output from processor 44 to camera 58 is also provided to an optional monitor unit (for monitoring its content). Such monitor unit includes an audio decompression means (preferably a Sony Model DFR-D2000 decoder unit available from Sony Corporation, where units 42 are implemented as Sony DFR-E2000 encoders), and loudspeakers for playing the separate channels of the decompressed audio.

A Sony Model DFR-P2000 processor unit (available from Sony Corporation) is suitable for use as processor 44 in preferred embodiments of the FIG. 6 system.

Digital camera 58 includes a film transport mechanism 58A, and film exposure LED arrays 58B for photographically recording the SDDS formatted digital data from processor 44 on film 61 (i.e., in column areas on the film identical to column areas 5 and 7 of FIG. 1) as the film translates through camera 58. A Sony Model DFR-C2000A or DFR-C2000 camera (available from Sony Corporation) is suitable for use as camera 58 in preferred embodiments of the FIG. 6 system, provided that it is mechanically modified to pass unrecorded film 61 from magazine 60 directly to camera 56, and to receive film 61 (on which analog audio has been recorded) from camera 56 before recording SDDS format digital data on the film. LED arrays 58A of such a Sony Model DFR-C2000A (or DFR-C2000) camera emit red light.

Film magazine 60 is mounted to camera 58, and stereo analog sound recording camera 56 is mounted to camera 58. Camera 56 photographically records the amplified analog stereo audio signal output from amplifier 46 on the same film 61 on which camera 58 later records SDDS digital data from processor 44. The film transport mechanisms within cameras 58 and 56 and magazine 60 (mechanisms 58A, 56A, and 60A, respectively) translate the unrecorded film 61 from magazine 60 through camera 58, then through the recording means in camera 56 (which photographically records left and right audio soundtrack channels, corresponding to channels 2 and 4 of FIG. 1, on the film), and then through the film exposure LED arrays 58B in camera 58 (which record digital data in SDDS format on the film). These film transport mechanisms translate film 61 through cameras 58 and 56 at the "real time" rate (the rate at which a theater projector would translate a print made from the recorded negative film 61, which is typically 24 frames per second), and all photographic recording within cameras 56 and 58 is performed in real time. After the recording operations in cameras 56 and 58, magazine 60 takes up film 61, on which both analog and digital soundtracks (in the FIG. 1 format) have been recorded. A Westrex RA-1231 Optical Sound Recording Camera (available from Westrex), mechanically modified to receive unrecorded film 61 from camera 58 and to output recorded film 61 to camera 58, is suitable for use as camera 56 in preferred embodiments of the FIG. 6 system. Such a Westrex camera exposes film to white light to record an analog soundtrack thereon. The following modifications to an off-the-shelf Westrex RA-1231 camera will typically be necessary: the rear cover needs to be cut to allow passage of the interlock belt to camera 58; and drive gearing, and a new shaft and belt for interlock of camera 58 and the RA-1231 film transport drive system need to be installed. The Westrex RA-1231 will also be modified in the sense that a DC Servo drive motor 54 (preferably implemented using a DC Servo Drive System available from Westrex) is employed as its drive motor.

When the camera assembly comprising cameras 56 and 58 has recorded analog and digital soundtracks on film 61, the film is a sound negative film (which is used for producing a positive motion picture print).

Preferably (where camera 56 emits white light, and camera 58 emits light of only one visible wavelength), unrecorded film 61 is "black and white" 35 mm negative film stock, of a type conventionally used in camera 58 alone, where such film stock is formulated to be particularly sensitive to radiation of the wavelength emitted by camera 58 (e.g., a red wavelength). An example of such conventional film stock is the above-mentioned 35 mm negative film stock known as Eastman "2374" sound negative stock film (available from Eastman Kodak) which is particularly sensitive to radiation in the red visible range, which is often conventionally used in a Sony Model DFR-C2000A (or DFR-C2000) camera to record SDDS format digital soundtracks (since the LED arrays in this camera emit red light).

Both analog and SDDS digital soundtracks can be recorded on a single film 61 in real time using cameras 56 and 58 of the FIG. 6 system in accordance with the invention. To accomplish this, camera 56 can be an analog soundtrack camera which illuminates film with white light, camera 58 is a mechanically (but not optically) modified Sony Model DFR-C2000A (or DFR-C2000) camera which illuminates film with red light, and film 61 is black and white sound negative film stock formulated to be sensitive to red light (the film should also be formulated to have appropriate grain structure for recording digital data in bit areas of the intended size, and to have appropriate stability for the intended application). Alternatively, the recording means in camera 56 can be deactivated while camera 58 records SDDS format digital data on film 61 (and an analog soundtrack later recorded on the film using camera 96, in a manner to be described below).

DC Servo drive motor 54 is provided to power the film transport means and recording means within camera 56. Biphase machine controller and time code generator 62 is provided to supply biphase power to motor 54. Unit 62 (which is a Ketchum TC-1128 unit or equivalent in preferred embodiments) also generates LTC (time code) signals in response to reference video (having NTSC or PAL format) provided thereto from an external source, and outputs the LTC signals to playback device 40 for use in controlling operation of device 40. Unit 62 operates in response to start and stop commands from computer 48. In an alternative implementation, motor 54 is an AC motor, and unit 62 is replaced by a three phase power unit (which provides power to the AC motor). The three phase power unit would be controlled by BNC clock signals from clock generator 44B within processor 44, and clock generator 44B would generates the BNC clock signals in response to reference video (having NTSC or PAL format) provided thereto from an external source.

Computer 48 is programmed with appropriate software for supplying control data signals to CPU 44A of processor 44, and for receiving and processing data from CPU 44A. Optical measurement unit 50 (which can be an Advantest TQ8215/TQ13216 Optical Power Multimeter in preferred embodiments) detects signals indicative of the LED radiation (emitted by LED arrays 58B) which illuminates film 61 being translated through camera 58 (to record SDDS format data thereon) and provides these signals in the form of digital data to computer 48 for use in calibrating LED arrays 58B in camera 58 in response to control signals provided from computer 48 to LED arrays 58B.

The FIG. 6 system also includes a second camera assembly including a film magazine including reel 90 and combined digital and audio camera 96, and digital data system 70 and 80. System 70 asserts digital audio data to photographic recording means 93 within camera 96, and also asserts control signals to camera 96 for controlling operation of the camera. System 80 asserts digital time code data to photographic recording means 82 within camera 96. The digital audio data from system 70 is recorded by camera 96 on film 61 in a different format than the format in which camera 58 records digital data from processor 44 on film 61, and the time code data from system 80 is recorded by camera 96 on film 61 in yet another format different than the format in which camera 58 records digital data from processor 44 on film 61. Recording means 96A in camera 96 also records an analog soundtrack (output from amplifier 46) on film (using white light). Preferably, the digital data output by system 70 to camera 96 determines a digital soundtrack in the conventional format known as the Dolby SR-D format (where Dolby and SR-D are registered trademarks of Dolby Laboratories Licensing Corporation), and system 70 (together with camera 96) is a conventional system for generating and recording a digital soundtrack in the Dolby SR-D format.

It is contemplated that film 61, after analog and digital signals have been recorded thereon (in real time) in cameras 56 and 58 as described above, will be rewound and physically transferred to reel 90. Then, camera 96 and systems 70 and 80 are operated to record additional digital data on the same film 61. Where film 61 has low sensitivity to the wavelength (or wavelengths) of illuminating radiation employed in camera 96 (though the film has high sensitivity to the wavelength of illuminating radiation employed in camera 58 and the wavelength or wavelengths of illuminating radiation employed in camera 56), camera 96 is operated at a slow rate, in the following sense. Film 61 is translated through camera 96 at a specially chosen rate that is slower than a real time rate (e.g., 12 frames per second, in contrast with a real time rate of 24 frames per second through which the film has translated through cameras 56 and 58) to record the data from systems 70 and 80 on the film. Use of such a slow rate is required where the film would be underexposed if translated through camera 96 at a real time rate (e.g., in the case that camera 56 exposes areas of film 61 to white light, camera 58 exposes different areas of film 61 to red light, camera 96 exposes other areas of film 61 to green light, and film 61 is conventional "black and white" film formulated to be sensitive to red light but much less sensitive to visible light other than red light).

After undergoing "two pass" recording in the first camera assembly comprising cameras 56 and 58, and then in camera 96, film 61 has two digital soundtracks (having different formats), additional digital time code data (from system 80) in another format, and also an analog soundtrack recorded thereon.

Figure 8:
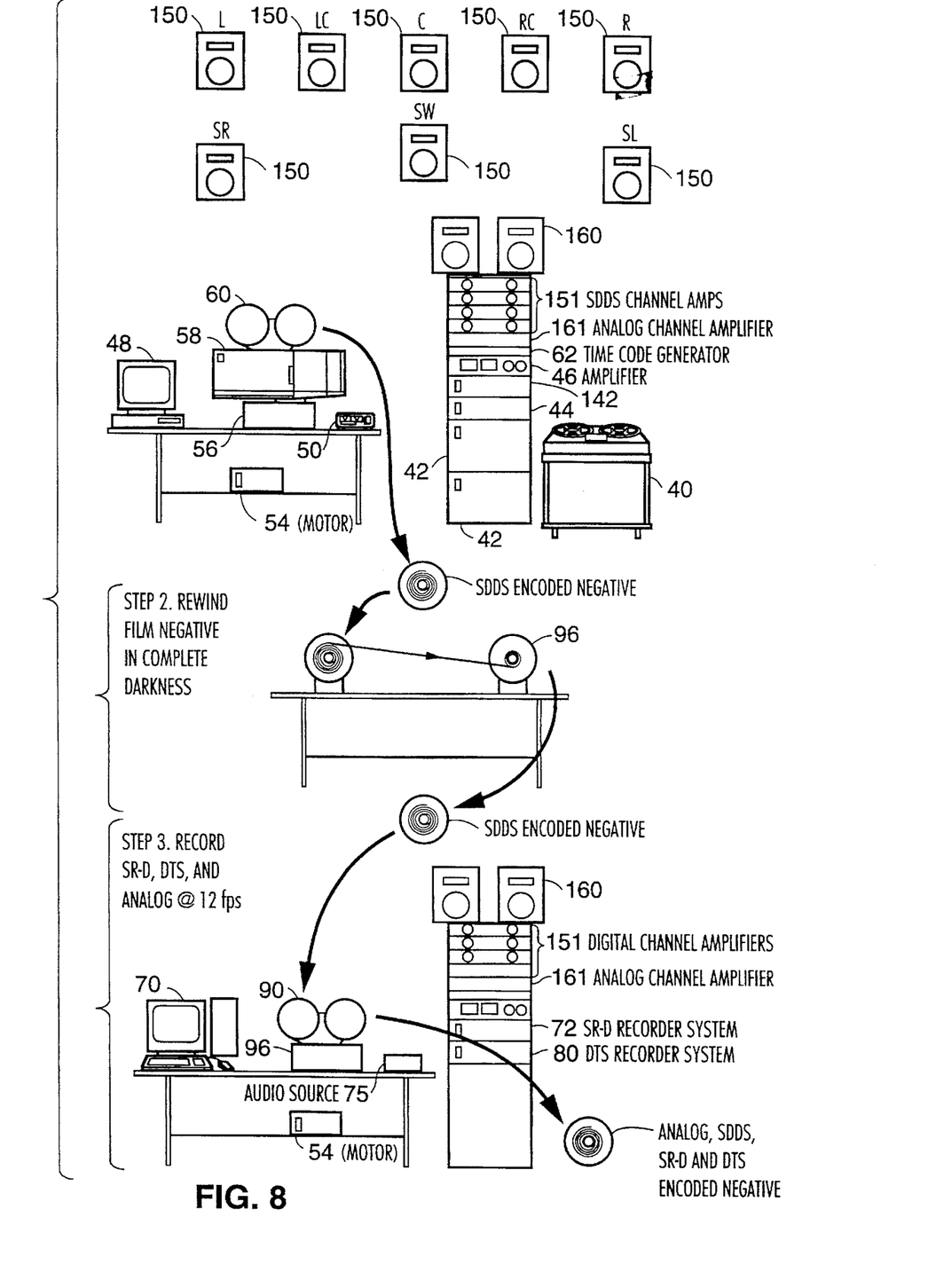
FIG. 8 is a diagram of the components of a variation on the FIG. 6 system.

We next describe a variation on above-described "two pass" recording process in more detail (with reference to FIG. 8 as well as FIG. 6). FIG. 8 is a diagram of components of a variation on the FIG. 6 system which includes a monitor unit (to be described below) for monitoring the content of the soundtrack data provided from processor 44 to camera 58. FIG. 8 indicates which elements of the FIG. 6 system are used in at the various stages of the overall recording process to be described.

First, digital data from processor 44 is recorded in SDDS format using red light in camera 58 (with film 61 transported through camera 58 at the rate of 24 frames per second. Next, the film is rewound to the beginning in total darkness (so as not to expose the film, thereby rendering the negative useless) onto reel 90.

The third step begins by loading reel 90 (containing the once-exposed, rewound film) onto analog/SR-D/DTS camera 96 and locating a punch hole (a hole physically punched through the film) near the start of the film, in total darkness (since exposure to light at this stage would render the negative useless). Using the punch hole, the film is aligned in camera 96 and camera 96 is operated to record SR-D format data (from system 70), analog signals (from amplifier 46), and DTS format data (from system 80) at 12 fps (frames per second). This slow rate is half the real time rate at which SDDS format data was recorded on the film in camera 58.

Figure 7:
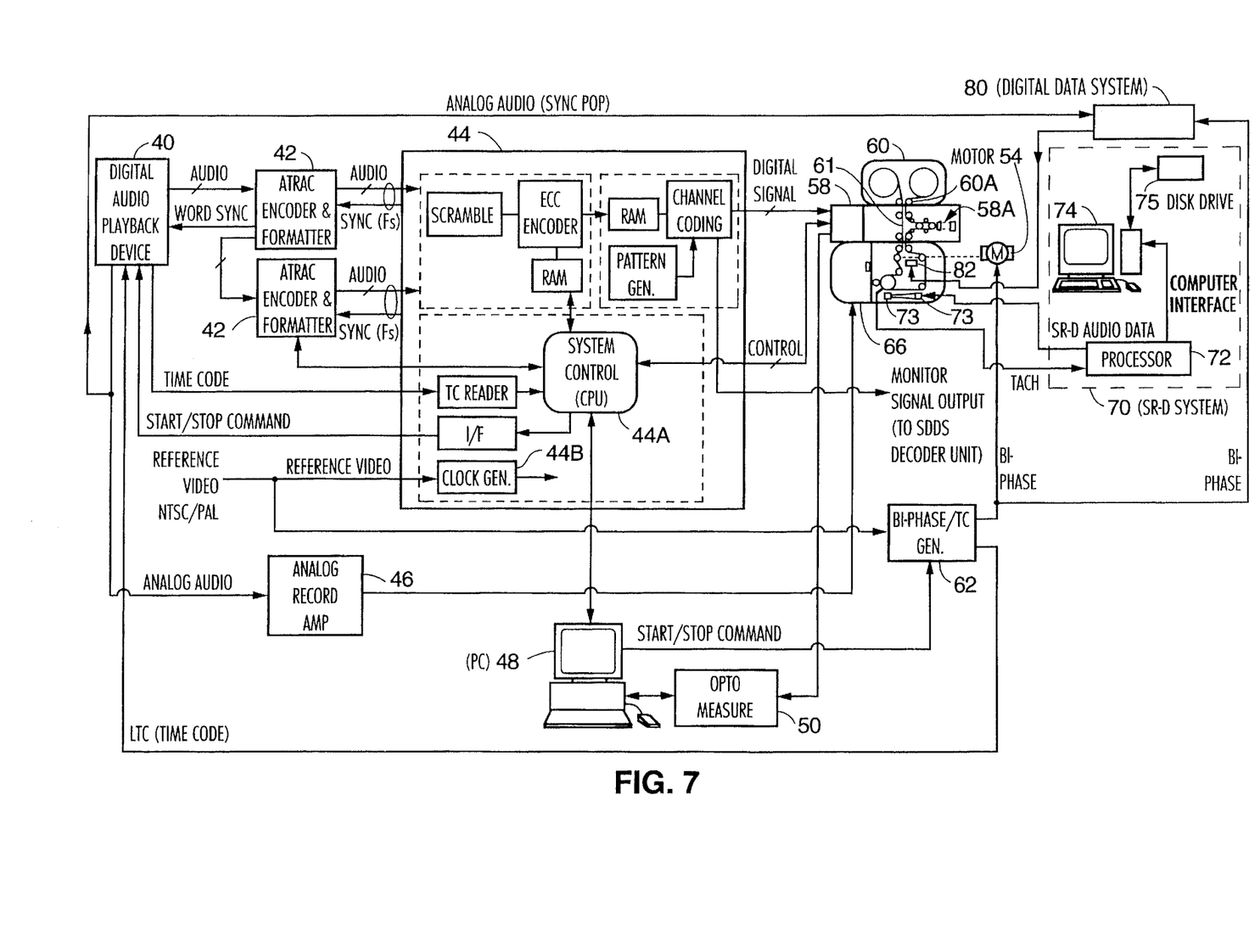
FIG. 7 is a block diagram of a preferred embodiment of the inventive system having a camera assembly for photographically recording digital data in three different digital formats, and analog audio signals, on a single motion picture film in real time (to produce film having the format shown in FIG. 5).

At this point, we digress to discuss the synchronization considerations underlying use of such a punch hole on film 61 (e.g., the need to synchronize all audio tracks recorded on film 61 by cameras 58 and 96) to a known reference. It is contemplated that film 61 is recorded as a sound negative, for use during a "composite" printing cycle, in which the sound negative, and also a separate "picture" negative film, are loaded onto a printer machine and with a single roll of unexposed positive print film stock. All three of these lengths of film are synchronized with sprockets. The positive film and negative films are then "rolled" to perform a contact printing function. Because the system is mechanically connected, the audio and the picture negative films are synchronized by industry standard methods. This primary synchronization of the picture negative and the sound negative is made using a specific length of film between a cue point and the start of picture (or sound) information on the relevant negative. An audio "cue" for the start of this known length is termed the "pop" signal. After the "pop" signal there is a fixed (typically nine foot) length of film before the start of sound/picture. This "pop" is the film industry standard for synchronization of the audio and picture. Therefore, when recording audio onto film, no matter what the type, synchronization to the "pop" must be maintained.

If all audio tracks on the sound negative film are simultaneously recorded (as will be described with reference to FIG. 7 below), then synchronization can be assured. However, as mentioned previously, due to exposure density constraints (underlying use of different wavelengths in cameras 58 and 96), one embodiment of the invention record one set of digital tracks using camera 58, then the film is rewound and removed for subsequent loading in another camera (camera 96) for additional recording. Due to the nature of present industry standards of film negative recording, the distance between the start point of the audio information recorded onto the film and the beginning edge of the film is normally unknown and a "don't care" state (in normal production techniques, this length of film is inconsequential and cut off during the "negative cutting" process (the process by which the exposed and developed negatives are prepared and fitted with an industry standard length of film, known as the "head length," between the pop sync area of the film and the physical end of the film.

Therefore, to properly align film 61 (which may have undergone a "negative cutting" process after processing in camera 58 and which thus may have had a head length added to it) in camera 96, a method is required for detecting a known location on the film 61 (before the film 61 is exposed a second time in camera 96) under conditions of total darkness. For the answer to this challenge, we prefer to use the technique of inserting a "punch hole" near the start of the film before any data is recorded thereon. This "punch hole" is placed in the film at the center of the picture area. The punch hole can easily be detected by the operator's sense of touch. The operator cannot see the punch hole "marker" due to the fact that the film must be loaded and positioned in absolute darkness (so as not to expose the film prematurely), therefore the "marker" must be detected by a means other than sight.

When making the initial recording of SDDS data on film 61 in camera 58, the "punch hole" is positioned just in front of the analog lens of camera 56. This gives the film a mechanical reference start point. The film is then encoded with the SDDS data by camera 58 (after passing through camera 56 to camera 58). After encoding of the SDDS data, the negative film is removed from the camera assembly comprising cameras 58 and 56 and magazine 60 (in total darkness) and re-wound so that the "punch hole" is once again at the beginning of the roll ("heads-out"). The film is then moved to camera 96 of the second stage recording system.

By loading the film and positioning the "punch hole" just in front of the analog lens of camera 96 in the second stage recording system, the same mechanical start point can be achieved on the second "pass" of recording. The recording process of the second stage is then performed by operating camera 96. After this second stage of recording, resultant negative film is encoded with all two formats of digital audio data and an analog soundtrack and with additional digital data, and is ready for normal 35 mm sound negative processing.

Next, we describe a preferred embodiment of the inventive system for photographically recording digital and analog audio signals on motion picture film (in the format of FIG. 5) in real time with reference to FIG. 7. Those components of the FIG. 7 system that are identical to corresponding components of the FIG. 6 system are numbered identically in FIGS. 6 and 7. These components perform the same functions in the systems of FIGS. 6 and 7, and the foregoing description of them will not be repeated with reference to FIG. 7.

The FIG. 7 system differs from the FIG. 6 system primarily in that the FIG. 7 system includes camera 66 (rather than separate camera assemblies 56 and 96). Time code data generator 80 for asserting digital data (preferably, time code data in the conventional DTS format, where DTS is a registered trademark of Matsushita Corporation) to photographic recording means 82 within camera 66, and digital data system 70 for asserting digital audio data to photographic recording means 73 within camera 66 (preferably, digital data determining a digital soundtrack in the conventional format known as the Dolby SR-D format, where Dolby and SR-D are registered trademarks of Dolby Laboratories Licensing Corporation) correspond to the identically numbered units in FIG. 6. In the FIG. 7 system, drive motor 54 is a DC servo motor and biphase machine controller and time code generator 62 is provided to supply biphase power to time code data generator 80 as well as to DC motor 54 (as shown also in FIG. 6).

Camera 66 can be optically identical to camera 96 of FIG. 6, but camera 66 differs from camera 56 (of FIG. 6) in that camera 66 includes recording means 82 positioned along the path of film 61 (for photographically recording DTS format time code data in a column area on film 61 identical to column area 32 of FIG. 5 as film 61 translates through camera 66), and also includes recording means 73 positioned along the path of film 61 (for photographically recording a digital soundtrack in the Dolby SR-D format in a column area on film 61 identical to column area 30 of FIG. 5 as film 61 translates through camera 66). Preferably, recording means 73 has a conventional design which illuminates bit areas of film 61 with green light (e.g., of wavelength 530 nm), to photographically record SR-D formatted digital data in these bit areas on film 61. Film 61 in the FIG. 7 embodiment should be chosen to be sensitive (and preferably, substantially equally sensitive) to each wavelength of illuminating radiation emitted by each recording assembly of its camera assembly (i.e., in each of recording assemblies 73 and 82, LED arrays 58B in camera 58, and the analog soundtrack recording assembly in camera 66). Film 61 should also be formulated to have appropriate grain structure (for recording digital data in bit areas of the intended size) and stability for the intended application. For example, one suitable type of film 61 would be very sensitive to light throughout the wavelength range of from 500 nm to 700 nm (which includes red and green light).

A Westrex RA-1231 Optical Sound Recording Camera (available from Westrex), mechanically modified to receive unrecorded film 61 from camera 58 and to output recorded film 61 to camera 58, is suitable for use as camera 66 in preferred embodiments of the FIG. 7 system. If the Westrex RA-1231 camera is an AC motor drive system, the following modifications thereto will typically be necessary: the rear cover needs to be cut to allow passage of the interlock belt to camera 58, a DC servo motor drive system (e.g., a Westrex DC Servo motor drive system) should be installed (to enable multiple format digital audio recording); and drive gearing, new shaft and belt for interlock of camera 58 and the RA-1231 film transport drive system need to be installed.

In the camera assembly of FIG. 7, unrecorded film 61 translates from film magazine 60 directly to the analog soundtrack recording means within camera 66, then past recording means 73 (which records SR-D format data on film 61), then past recording means 82 (which records DTS format digital data on film 61), and finally past the LED arrays within camera 56 (which record SDDS format digital data on film 61) before the fully recorded film returns to magazine 60. The film transport mechanisms in cameras 58 and 66 and magazine 60 translate the unrecorded film 61 from magazine 60 through cameras 58 and 66 and back to magazine 60 at the "real time" rate (the rate at which a theater projector would translate a print made from the recorded negative film 61, which is typically 24 frames per second), and thus all photographic recording within cameras 58 and 66 is performed in real time.

System 70 of FIG. 7 includes processor 72 (which generates a stream of SR-D format digital data for recording by recording means 73 on film 61) and computer 74 (programmed with appropriate software for supplying control data signals to processor 72, and for receiving and processing data from processor 72). Processor 72 receives tachometer signals (from a sensor in camera 66) indicative of the speed at which film 61 is translating past recording means 73 (i.e., the frequency of occurrence of perforations at the edge of the film), and in response to the tachometer signals (and control signals from computer 74) supplies an output stream of SR-D format digital data to recording means 73.

Time code data generator 80 of FIG. 7 asserts digital time code data to recording means 82 in camera 66. Operation of generator 80 is synchronized by sync pulses occurring in the analog audio signal output from playback device 40 (and received by generator 80 as well as by amplifier 46). In preferred implementations, generator 80 is a conventional DTS format time code data generator which outputs a stream of time code data in conventional DTS format. Recording means 82 (which has a conventional design for recording DTS format digital data on motion picture film) photographically records this data as a synchronization track on film 61 (in a column area on the film identical to column area 32 of FIG. 5) as the film translates through camera 66. When a positive print film is made from recorded negative film 61, and the positive print is played at the standard rate of 24 frames per second, sync pulses or time codes comprising this recorded synchronization track are read at a standard video rate (e.g., the standard NTSC video rate of about 30 frames per second).

All data encoding systems of FIG. 7 are synchronized either electronically or mechanically. This process, is very similar in functional flow to the corresponding process in conventional analog only soundtrack recording. The major differences are in the area of synchronization and quality control tools.

The synchronization of the FIG. 7 system is accomplished through several interlocking methods, all of which are referenced to a master video sync generator. This generator feeds 60 Hz (or 50 Hz, in alternative embodiments) field rate video reference to units 44 and 62 which are the two master timing controllers of the system. All other control and synchronization signals are output from processor 44 (preferably a Sony DFR-P2000 processor) and unit 62. (preferably a Ketchum TC-1128 Time Code and Bi-Phase Generator). Hence, all subsequent synchronization signals are referenced to the same source.

In the case of the SDDS subsystem, the master clock of processor 44 (output from unit 44B) is referenced to the 60 Hz video reference source. Processor 44 (the DFR-P2000 processor) feeds master clock signals (preferably 44.1 kHz signals) to SDDS data encoders 42. One of encoders 42 outputs a 44.1 kHz reference signal (denoted "Word Sync" in FIG. 7) to playback device 40 (which is preferably a PCM-3324S audio playback device) thereby synchronizing device 40 with the master source. Therefore, the timing synchronization hierarchy for the SDDS subsystem is Video Sync (60 Hz) to Word Sync (44.1 kHz).

Although the Word Sync synchronization signal handles the phase lock of the data transmissions (to processor 44) and the tape transport speed within device 40, there is also the issue of absolute address to consider. In other words, the video reference can control the speed at which the data flows and the tape machine (within device 40) runs, however the system still requires that there be absolute address information fed from the camera device to device 40 for address lock of the two electromechanical devices. For this synchronization, we utilize unit 62 (which is preferably a Ketchum TC-1128 Time Code and Bi-Phase Generator).

Unit 62 generates both bi-phase power and LTC (Longitudinal Time Code) in sync with each other and both of these outputs will be in sync with the input video reference source. The bi-phase signal is used to control the motion of the film transport mechanism in camera 66 and ultimately the film motion. The longitudinal time code signal is provided from device 62 to playback device 40 for use as the address sync control input for device 40. The bi-phase signal output from device 62 has a frequency of 240 Hz (for film transport at the real time rate of 24 frames per second or "fps"). The LTC output from device 62 has a frequency of 30 Hz and timing values within the specification of SMPTE (Society of Motion Picture and Television Engineers) non-drop frame time code. Device 40 reads this time code address value and "chase locks" to the address value. Device 40 will find the correct lock address of the incoming code, locate the audio tape to be played back to the exact value (or an offset value previously entered into memory) and synchronize the playback of the audio tape to the address and speed of the time code input from device 62. This "lock time" (the total time required for device 40 to achieve full address and phase lock with the incoming time code) is specified to be less than 10 seconds. Nominally, this time is less than 7 seconds.

For Dolby SR-D generation system 70, the synchronization is a "slave" condition. Since processor 72 within system 70 operates its data speed "servo" from an electronic tachometer (as described above, by counting the perforations on the edge of the film), system 70 can be considered as part of camera 66 in this respect. Hence, when camera 66 moves film, processor 72 detects this motion accurately and controls its data transmission (to recording means 73 in camera 66) internally. In this way, a "mechanical" synchronization occurs between camera 66 and system 70. In addition, since camera 66 is speed and phase controlled by device 62, and since device 62 is referenced to the master video reference, system 70 is locked in phase with the SDDS subsystem (which includes processor 44) and analog audio data output from playback device 40.

The previous paragraph details the synchronization of system 70 to the overall FIG. 7 system, yet no control has yet been specified for the Start Point of each write of SR-D format data from system 70 to means 73 in camera 66. Each SR-D data write is internally controlled (within system 70) to begin writing digital data to camera 66 at a predetermined number of tachometer pulses (film sprocket perforations) from "dead stop" (the state whereby the film transport mechanism in camera 66 has no motion). This value is preset by the operator through the use of computer 74 in system 70.

The synchronization of the FIG. 7 system (which is a "single pass" real time recording system) is a complex aspect of the present invention. Absolute synchronization of the various audio master playback sources (including playback device 40 in the SDDS subsystem, and SR-D master audio source 75 within system 70) which feed the multiple format camera assembly (comprising cameras 58 and 66) and the multiple format camera assembly itself must be maintained. Before we describe additional synchronization details, more details regarding the audio signal flow from the various playback devices to the respective recording assemblies within cameras 66 and 58 will next be explained.

There are two discrete audio sources that must be synchronized, not only to each other, but also to the devices which their respective playback signals are being transmitted. The audio flow for the SR-D format signals are from source 75 (which is a magneto-optical disk drive), to computer 74, then on to processor 72 (which is preferably a Dolby CA-10 interface box) which drives recording means 73 (which is preferably a LED transducer assembly). The SDDS format digital data, and the analog signals originate from device 40 (preferably a Sony PCM-3324S device or comparable digital audio playback device, or a synchronizable analog device fitted with appropriate A/D converters and an AES/EBU format digital audio output). In addition to the SDDS digital audio tracks being played back from device 40, the analog sound track master is played back from device 40 to amplifier 46. This analog sound track master is also used to trigger the start of DTS time code generator 80.

This makes it possible to synchronize the start point of each write of SR-D format data (to recording means 73) to the start point of each write of SDDS format data (to recording means 58A).

Synchronization of DTS format time code data generation system 80 is more simple. System 80 simply writes internally generated time code values (in DTS format) to transducer 82 (preferably a green LED and lens assembly). DTS time code generator 80 is started by the analog "pop" signal played back from either device 40 or from magneto-optical disk system 75 of system 70).

The START/STOP command for the entire system of FIG. 7 is controlled by SDDS controller computer 48 (preferably an external, IBM compatible PC). To start operation of the complete FIG. 7 system, computer 48 activates a relay closure which sends a command signal to device 62. Once device 62 receives the command, output of the bi-phase and LTC (time code) signals commences and all of the aforementioned synchronization systems lock and recording of all data and analog track begins.

With reference to both FIGS. 6 and 7, unexposed film 61 is preferably "black and white" motion picture negative film of the type known as "35 mm" motion picture film which has standard dimensions including the following: an overall film width of 34.975 mm, a distance of 2.01 mm between the outer edge of each sprocket hole and the film edge nearest thereto, and a distance of 4.80 mm between the inner edge of each sprocket hole and the film edge nearest thereto. These standard film dimensions are set forth in the "American Standards and Recommended Practices of the Society of Motion Picture and Television Engineers" for 35 mm motion picture film.

Although each bit area of film 61 (onto which a bit of the digital data is recorded) is preferably square or rectangular, each could have another shape. The minimum practical bit size will depend on the film characteristics (i.e., graininess). It is within the scope of the invention for the digital data to be recorded on regions of the film including any number of rows and columns of bit areas. The rows can be arranged with no space between them or with unexposed strips (oriented perpendicular to the film travel direction) between them.

Figure 2:
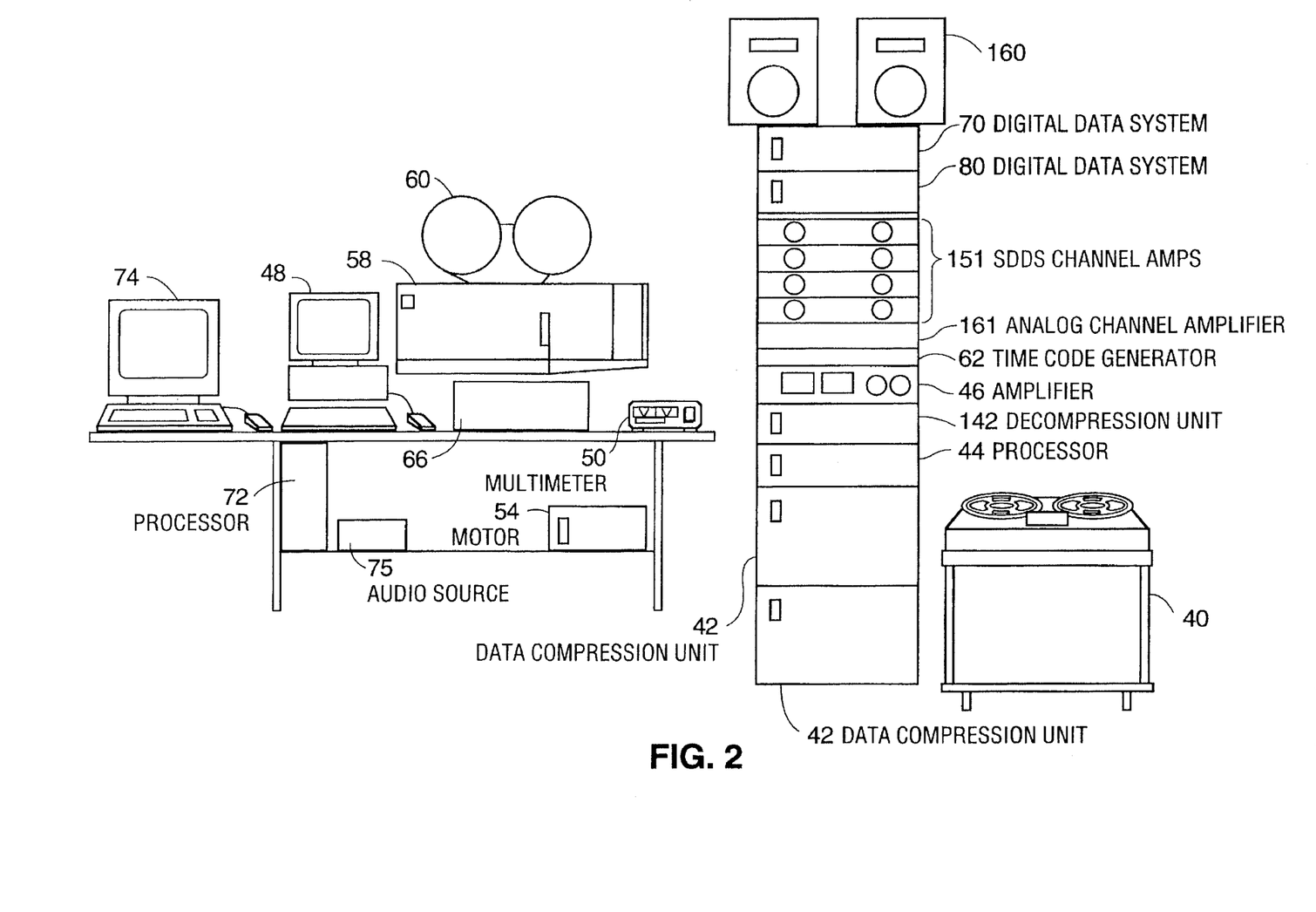
FIG. 2 is a diagram of components of a variation on the FIG. 7 system.

FIG. 8 is a diagram of the components of a variation on the FIG. 6 system, which includes a monitor unit (for monitoring the content of the soundtrack data provided from processor 44 to camera 58). Such monitor unit includes an audio decompression unit 142 (preferably a Sony Model DFR-D2000 decoder unit available from Sony Corporation), eight loudspeakers 150 (each speaker for playing a separate channel of the preferred eight-channel SDDS-format audio soundtrack output from processor 44 after these channels are decompressed in unit 142 and amplified in SDDS channel amplifiers 151), and two loudspeakers 160 (each speaker for playing a separate channel of the two-channel analog audio soundtrack output from amplifier 46 after these channels have been further amplified in analog channel amplifier 161). Similarly, FIG. 2 is a diagram of components of a variation on the FIG. 7 system which includes the monitor unit of FIG. 8 (speakers 150 are not shown in FIG. 2) for monitoring the content of the soundtrack data provided from processor 44 to camera 58. The portion of the FIG. 8 system other than the monitor unit operates in the same manner as does the FIG. 6 system. The components of FIG. 8 identical to those of FIG. 6 are numbered identically in FIGS. 6 and 8 and the description thereof will not be repeated. The portion of the FIG. 2 system other than the monitor unit operates in the same manner as does the FIG. 7 system. The components of FIG. 2 identical to those of FIG. 7 are numbered identically in FIGS. FIGS. 2 and 7 and the description thereof will not be repeated.

Although embodiments for recording digital data and analog audio on motion picture film have been described, it is within the scope of the invention to photographically record the described digital data and analog audio on a photosensitive medium other than a motion picture film.

Various modifications and alterations in the described embodiments of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A system for photographically recording digital data on a photosensitive medium, including:

first recording means for photographically recording a first stream of digital data in a first format on a first digital data area of the medium as said medium translates through the first recording means; and second recording means for photographically recording a second stream of digital data in a second format on a second digital data area of the medium as said medium translates through the second recording means.

2. The system of claim 1, also including:

transport means for translating the medium through the first recording means and the second recording means at a real time rate, wherein the first recording means photographically records the first stream of digital data on the first digital data area as the medium translates through the first recording means at the real time rate, and the second recording means photographically records the second stream of digital data on the second digital data area as the medium translates through the second recording means at the real time rate.

3. The system of claim 2, also including:

third recording means for photographically recording an analog soundtrack on an analog soundtrack region of the medium, wherein the transport means translates the medium through the third recording means as well as through the first recording means and the second recording means at the real time rate, and wherein the third recording means photographically records the analog soundtrack on the analog soundtrack region as the medium translates through the third recording means at the real time rate.

4. The system of claim 3, wherein the photosensitive medium is a motion picture film having a longitudinal axis, and the analog soundtrack region is oriented substantially parallel to the longitudinal axis.

5. The system of claim 2, wherein the photosensitive medium is a motion picture film having a longitudinal axis, wherein the first stream of digital data includes first digital audio bits that determine a first digital soundtrack and the second stream of digital data includes second digital audio bits that determine a second digital soundtrack.

6. The system of claim 5, wherein the first recording means exposes the motion picture film to radiation having a first wavelength during recording of the first digital audio bits, and the second recording means exposes the motion picture film to radiation having a second wavelength during recording of the second digital audio bits, and the motion picture film is black and white negative film substantially equally photosensitive to radiation of the first wavelength and radiation of the second wavelength.

7. The system of claim 1, wherein the photosensitive medium is a motion picture film having a longitudinal axis, wherein the first stream of digital data includes first digital audio bits that determine a first digital soundtrack and the second stream of digital data includes second digital audio bits that determine a second digital soundtrack.

8. The system of claim 7, wherein the motion picture film has sprocket holes extending therethrough in a first column area parallel to the longitudinal axis near a first edge of the film and in a second column area parallel to the longitudinal axis near a second edge of the film, wherein the first digital data area is in the first column area, and wherein the second digital data area is between the second column area and the second edge.

9. The system of claim 1, also including:

first transport means for translating the medium through the first recording means at a real time rate; and second transport means for translating the medium through the second recording means at a second rate, wherein the second rate is slower than the real time rate, wherein the first recording means photographically records the first stream of digital data on the first digital data area as the medium translates through the first recording means at the real time rate, and the second recording means photographically records the second stream of digital data on the second digital data area as the medium translates through the second recording means at the second rate.

10. The system of claim 9, wherein the first recording means exposes the motion picture film to radiation having a first wavelength during recording of the first stream of digital data, and the second recording means exposes the motion picture film to radiation having a second wavelength during recording of the second stream of digital data, and the motion picture film is black and white negative film substantially more photosensitive to radiation of the first wavelength than to radiation of the second wavelength.

11. A system for photographically recording an analog soundtrack and digital data on a photosensitive medium in real time, wherein the digital data includes first digital audio bits that determine a first digital soundtrack having a first format and second digital audio bits that determine a second digital soundtrack having a second format, said system including:

a camera assembly;

analog soundtrack means coupled to the camera assembly for providing the analog soundtrack to the camera assembly;

digital data means coupled to the camera assembly for providing the digital data to the camera assembly, wherein the camera assembly includes:

transport means for translating the medium through said camera assembly at a real time rate;

first recording means for receiving the analog soundtrack and photographically recording the analog soundtrack on an analog soundtrack region of the medium as said medium translates through the first recording means at the real time rate;

second recording means for receiving the first digital audio bits from the digital data means and photographically recording said first digital audio bits on a first digital data area of the medium as said medium translates through the second recording means at the real time rate; and third recording means for receiving the second digital audio bits from the digital data means and photographically recording said second digital audio bits on a second digital data area of the medium as said medium translates through the third recording means at the real time rate.

12. The system of claim 11, wherein the photosensitive medium is a motion picture film having a longitudinal axis, and the analog soundtrack region is oriented substantially parallel to the longitudinal axis.

13. The system of claim 12, wherein the second recording means exposes the motion picture film to radiation having a first wavelength during recording of the first digital audio bits, and the third recording means exposes the motion picture film to radiation having a second wavelength during recording of the second digital audio bits, and the motion picture film is black and white negative film substantially equally photosensitive to radiation of the first wavelength and radiation of the second wavelength.

14. The system of claim 13, wherein the first wavelength is in the green visible range and the second wavelength is in the red visible range.

15. The system of claim 11, wherein the medium is black and white motion picture negative film.

16. A photosensitive medium, having a first edge, a second edge, a longitudinal axis parallel to the first edge and the second edge, and including:
- a first digital data area in which rows and columns of digital data bits in a first format have been photographically recorded by exposing the medium to radiation of a first wavelength, wherein the columns of the digital data bits in the first format are oriented substantially parallel to the longitudinal axis; and
- a second digital data area in which rows and columns of digital data bits in a second format have been photographically recorded by exposing the medium to radiation of a second wavelength, wherein the columns of the digital data bits in the second format are oriented substantially parallel to the longitudinal axis.

17. The medium of claim 16, also including:
an analog soundtrack area in which an analog soundtrack has been photographically recorded in an orientation substantially parallel to the longitudinal axis.

18. The medium of claim 16, wherein the medium is substantially equally photosensitive to radiation of the first wavelength and radiation of the second wavelength prior to exposure to radiation of said first wavelength and said second wavelength.

19. The medium of claim 18, wherein the medium is a motion picture film.

20. The medium of claim 16, wherein the medium is a motion picture film.

21. The medium of claim 20, wherein the medium, prior to exposure to the radiation of the first wavelength and the radiation of the second wavelength, is black and white negative motion picture film substantially equally photosensitive to radiation of the first wavelength and radiation of the second wavelength.

22. The medium of claim 20, wherein the motion picture film has sprocket holes extending therethrough in a first column area parallel to the longitudinal axis near the first edge and in a second column area parallel to the longitudinal axis near the second edge, the first digital data area is in the first column area, and the second digital data area is between the second column area and the second edge.

* * * * *